(12) United States Patent
Talarek

(10) Patent No.: US 6,668,298 B1
(45) Date of Patent: Dec. 23, 2003

(54) SHIFTING AN INPUT SIGNAL FROM A HIGH-SPEED DOMAIN TO A LOWER-SPEED DOMAIN

(75) Inventor: Wieslaw Talarek, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,750

(22) Filed: Dec. 29, 1999

(51) Int. Cl.[7] ............................................. G06F 13/14
(52) U.S. Cl. ..................................................... 710/305
(58) Field of Search ...................... 710/71, 305; 377/64, 377/94, 118

(56) References Cited

U.S. PATENT DOCUMENTS

| | | | | |
|---|---|---|---|---|
| 3,634,658 A | * | 1/1972 | Brown | 377/33 |
| 4,692,893 A | * | 9/1987 | Casper | 710/55 |
| 4,706,266 A | * | 11/1987 | Qayyum | 377/33 |
| 4,935,920 A | * | 6/1990 | Taniguchi et al. | 370/465 |
| 5,894,567 A | * | 4/1999 | Dodd et al. | 713/400 |
| 5,966,421 A | * | 10/1999 | Haubursin et al. | 377/47 |
| 5,995,029 A | * | 11/1999 | Ryu | 341/101 |

FOREIGN PATENT DOCUMENTS

| | | | | |
|---|---|---|---|---|
| EP | 748057 A1 | * 12/1996 | .......... | H03M/13/12 |
| JP | 62092520 A | * 4/1987 | .......... | H03K/23/50 |
| JP | 63093224 A | * 4/1988 | .......... | H03K/23/66 |
| JP | 06164551 A | * 6/1994 | ............. | H04L/1/00 |
| JP | 07212223 A | * 8/1995 | .......... | H03K/23/00 |

* cited by examiner

*Primary Examiner*—Paul R. Myers
(74) *Attorney, Agent, or Firm*—Kenyon & Kenyon

(57) ABSTRACT

A technique for shifting an input signal from a high-speed domain to a lower-speed domain receives a high-speed input at a high clock speed rate and shifts it into a local shift register so that the input signal may be shifted into a lower speed clock domain. A high speed clock is used to clock a shift register which receives the high-speed input and a counter is used to count the number of high speed clocks. One output of the counter is latched and another output of the counter is used to control latching of outputs of the shift register. Additional latches and a leading edge detector are clocked by a lower-speed clock having a frequency which is a sub-multiple of the frequency of the higher speed clock. An output of the leading edge detector controls the additional latches while the latched output of the counter serves as an input of the leading edge detector. The latched outputs of the shift register are input to additional latches whose outputs are inputted to one input of a bitwise adder which has a second input for receiving an output of other additional latches, an output of the bitwise counter being input into an input of the second additional latch. The output of other additional latches corresponds to the input signal received by the shift register but at a lower frequency.

21 Claims, 6 Drawing Sheets

B = LATCH ENABLE

CHANGE OF STATUS DUE TO THE LEADING EDGE OF CLOCK CLK

| AA | 0 | 0 | 1 | 1 | 0 | 0 | 1 | 1 | 1 | 0 | 0 |
|---|---|---|---|---|---|---|---|---|---|---|---|
| B | 0 | 0 | 0 | 0 | 1 | 1 | 1 | 1 | 1 | 1 | 1 |
| C | 0 | 1 | 0 | 1 | 0 | 0 | 1 | 0 | 1 | 1 | 0 |
| X | 0 | 1 | 0 | 1 | 0 | 0 | 1 | 1 | 1 | 0 | 0 |
| CLK | ⌐ | ⌐ | ⌐ | ⌐ | ⌐ | ⌐ | ⌐ | P* | ⌐ | P* | ⌐ |

P* : PREVIOUS STATE PRIOR TO THE LEADING EDGE OF CLOCK CLK

SHIFTING AN INPUT SIGNAL FROM A HIGH-SPEED DOMAIN TO A LOWER-SPEED DOMAIN

FIELD

The present invention relates to a high-speed to lower-speed domain shifting technique and more particularly, the present invention relates to a technique for shifting an input signal from a high-speed domain into a lower-speed clock domain.

BACKGROUND

There are many applications in which digital events must be captured at a high speed and then counted and displayed and/or forwarded to additional digital elements for further processing.

For example, network devices, such as hubs, switches, Remote Network Monitors (RNOM) probes might use hardware counters to speed up statics gathering.

Counters or adders might be implemented in the same time domain as the incoming high-speed events. However, circuits such as adders and counters tend to be slower than shift registers and their preferred usage is in a low speed clock domain.

Thus, the circuit frequency can be affected adversely and operation at full speed may not be possible. This problem is particularly relevant when large adders or counters are required.

SUMMARY

An apparatus for shifting an input signal from a high-speed domain to a lower speed domain includes a counting unit for receiving and counting a high-speed clock. A shift register, connected to a first set of latches, receives an input signal and shifts it out to be latched by the first set of latches in accordance with the high-speed clock, a latch input of the first set of latches receiving a first output of the counting unit. A second set of latches is connected to a bitwise adder connected to a third set of latches. The outputs of the first and third sets of latches are input to the bitwise adder. A detector having an output is connected to latch inputs of the second and third set of latches and receives a second output of the counting unit. The detector and the second and third set of latches operate in accordance with a lower-speed clock. The lower speed clock is a submultiple of the higher speed clock. An output of the third set of latches corresponds to the input signal shifted from a higher-speed domain to a lower-speed domain.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
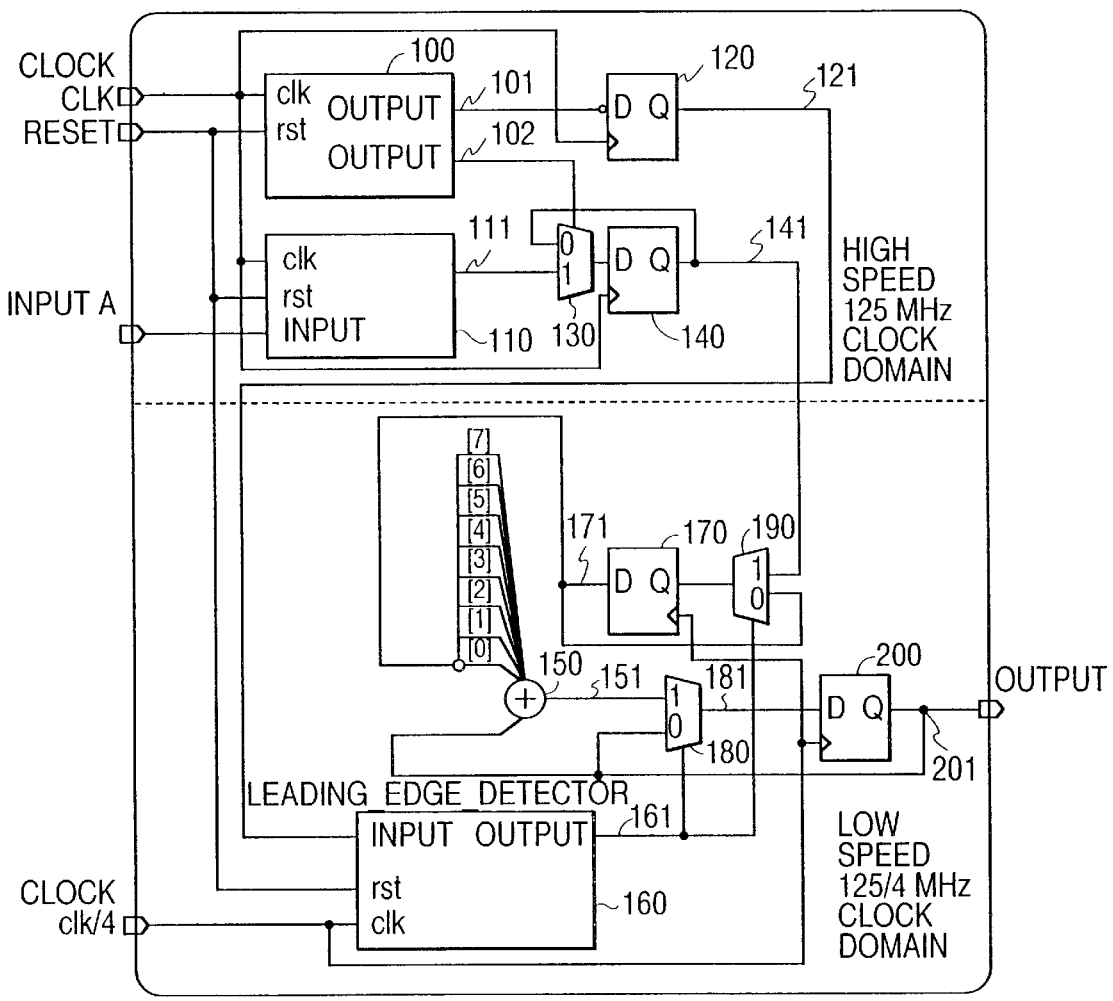
FIG. 1 is an example diagram of an example in accordance with one embodiment of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Still further, the clock and timing signal Figs. are not drawn to scale, and instead, exemplary and critical time values are mentioned when appropriate. With regard to description of any timing signals, the terms assertion and negation may be used in an intended generic sense. More particularly, such terms are used to avoid confusion when working with a mixture of "active-low" and "active-high" signals, and to represent the fact that the invention is not limited to the illustrated/described signals, but could be implemented with a total/partial reversal of any of the "active-low" and "active-high" signals by a simple change in logic. As a final note, well known power/ground connections to ICs and other components may not be shown within the Figs. for simplicity of illustration and discussion, and so as not to obscure the invention.

FIG. 1 is a diagram of a circuit in accordance with the present invention.

It is noted that the present invention is applicable to any clock frequency and to any sub-multiple of the clock frequency. That is, in the example illustrated in FIG. 1, a high-speed clock frequency of 125 MHz has been chosen merely for illustrative purposes and the low speed clock frequency has been chosen for illustrative purposes only to be 125/4 (that is ~31.25 MHz).

The low speed clock frequency can be chosen to be equal to the high-speed clock frequency divided by N, where N is an integer greater than one. Furthermore, the high speed and low speed clocks may be mis-aligned with respect to time.

Referring back to FIG. 1, the high-speed clock domain portion of the circuit includes a counter 100, a pipe or shift register 110, a D type flip flop 120, and a set of latching circuits each consisting of a multiplexer 130 and another D type flip flop 140. There are eight outputs of the shift register 110 but to avoid confusion, they have been illustrated as a single bus output 111. Only one multiplexer 130 and flip flop 140 have been shown. There are actually eight of each in this example. Each multiplexer 130 input is connected to one respective output of the shift register 110.

The range of the counter 100 may be between 0 to $2^{N-1}-1$ where N is an integer greater than one. In the example, since N equals four, the counter 100 must count from 0 to 7. The width of the shift register or pipe 110 may be equal to $2^{N-1}$ which in the present case is equal to 8. That is, the shift register 110 is an 8 bit shift register.

Each latch circuit, consisting of the multiplexer 130 and the D type flip flop 140, receives one output from the shift register 110 and a latch output 102 from the counter 100 and maintains each Q output 141 of each flip flop 140 at whatever the last output of the shift register 110 was until the latch output 102 of the counter 100 (carry over) changes and at that point, each Q output 141 of each flip flop 140 changes to reflect the respective output 111 of the shift register 110.

Figures 2A, 2B:
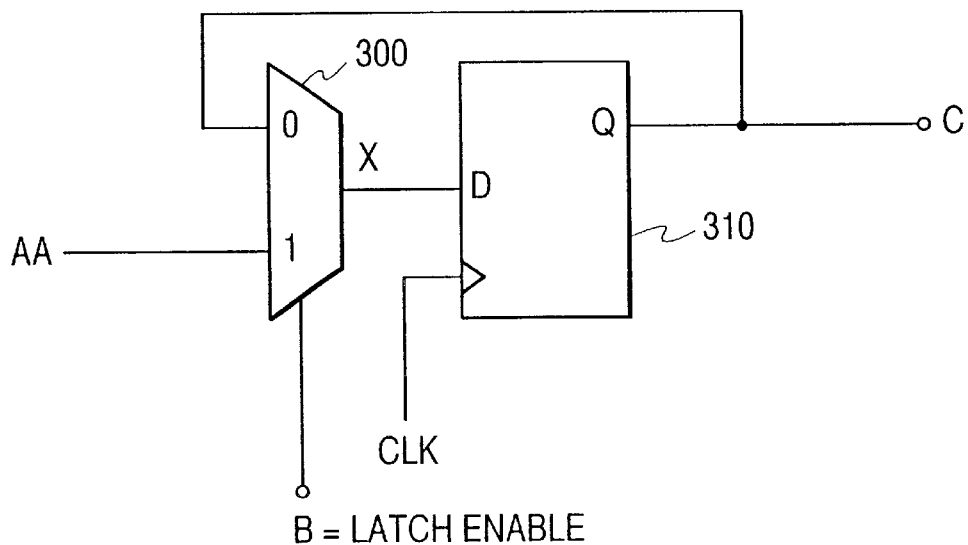
FIG. 2A is an example diagram of a latch circuit of FIG. 1.
FIG. 2B is a truth table of the latch circuit of FIG. 2A.

FIG. 2A illustrates one of the latch circuits noted above with regard to FIG. 1. FIG. 2B is a truth table of the latch circuit of FIG. 2A.

Element 300 of FIG. 2A is a multiplexer whose output X outputs a value equal to that of C when the latch enable input B is a low logic level and produces an output having a value equal to that of input AA when the latch enable B is a high logic level.

The output X is inputted to the D input of a D type flip flop 310 which receives a clock input CLK at its clock input. The output of the D type flip flop 310 at its Q terminal is set to whatever logic level is inputted to its D input when the signal at its clock input CLK goes from a low logic level to a high logic level. Since the output of the flip flop 310 is fed back to the 0 input of the multiplexer 300, looking at the truth table of FIG. 2B, it can be easily ascertained that when the latch enable signal B is at a low logic level, the output C remains unchanged upon each leading edge of the clock signal CLK. On the other hand, when the latch enable B is at a high logic level, the output C of the flip flop 310 is set to the logic level of the input AA upon the occurrence of the leading edge of the clock signal CLK.

C changes the value of X at the leading edge (↯ symbol) of the clock CLK (on a basic D flip-flop). If B is high, the value of X becomes that of AA. C has the value of X before B changes from low to high. C changes to the new value of X at the leading edge of the clock.

While the latch circuit of FIG. 2A is utilized in three sets of instances in FIG. 1, one skilled in the art would of course understand that there is no one unique digital circuit to perform any particular function. Thus, the latch circuit of FIG. 2A utilized in FIG. 1 is merely for exemplary purposes and the present invention is of course not limited to such a circuit.

Returning discussions to FIG. 1, the low speed clock domain portion of the circuit includes a leading edge detector 160, a set of latching circuits each consisting of D flip flop 170 and multiplexer 190 and another set of latching circuits each consisting of D flip flop 200 and multiplexer 180. In addition, a bitwise adder 150 performs a bit wise addition of each Q output 171 of each flip flop 170 and each Q output 201 of each flip flop 200. As with the set of latches noted above with regard to the high speed domain, only one flip flop 170, flip flop 200, multiplexer 190 and multiplexer 180 has been shown to avoid confusion, although there would actually be eight (170,190) and thirty two (180, 200) in the example circuit.

Bitwise added 150 (hereinafter, sometimes "adder" for simplicity) is basically a two stage circuit. First, all of the outputs 171 are added and result in a combinatorial value, that is, an intermediate value, that is not shown in the drawings and is implied in the adder 150. Secondly, the outputs 201 is then added to the combinatorial value and the outputs 151 fed to the multiplexers 180 feeding their respective flip flops 200. Note that the output 141 and the output of multiplexer 190 and the output 171 are 8 bit buses but have been shown as a single line for simplicity. The outputs 151, 181, and 201 are 32 bit buses but as with the buses noted above, they also have been shown as single lines for simplicity. It is, of course, understood that the present invention is not limited to buses of this size but rather these sizes are merely for explanatory purposes.

An external reset signal rst is used to reset the entire system by resetting the counter 100, shift register 110 and leading edge detector 160. The high-speed digital event input A is fed to the input of the shift register 110 and the high-speed clock clk is fed to the clock inputs of both the counter 100 and the shift register 110 as well as the clock inputs of the D flip flop 120 and the D flip flop 140. The output 101 of the counter 100 which is actually 3 bits is latched by the D flip flop 120 whose output 121 serves as a data ready signal.

Note that in this example, the data ready signal 121 is generated when the output of the counter 100 is one half its maximum value. However, other count values of the counter 100 may be chosen to generate the data ready signal, depending upon the width of the counter and the particular application of the circuit.

The low speed clock clk/4 is input to the clock circuit of the leading edge detector 160 and the clock inputs of the flip flops 170 and 200. Then, the data ready output 121 is fed to the input of the leading edge detector so as to produce an output 161 from the leading edge detector which latches the latch circuits, each consisting of either flip flop 170 and multiplexer 190 or flip flop 200 and multiplexer 180. The leading edge detector output 161 is actually synchronized to 125/4 MHz duplicate of the counter 100. The task of the leading detector circuit is to synchronize wide-pulses and convert to the one-clock pulse. So, in this case, the output of the flip flop 140 lasts for 8 pulses of the 125 clock and should be added only once during this period. The N/2 counter 100 generates the divide by two pulse 101 that is detected by the leading edge detector 160. The leading edge detector 160 runs on the clock 125/4 MHz that is twice as fast the input to the leading edge detector 160. By doing so, only once is the change latched and as a result, only once per 8 clock periods does the adder add a new event count 141 to the existing sum.

The value latched in the flip flops 170 is the value output from the Q outputs 141 of the flip flops 140. The Q outputs 171 of the flip flops 170 are bit wise added to the Q output 201 of the flip flops 200 and the result latched in the flip flops 200.

While the input A is synchronous with the clock clk, the output 201 is synchronous with the clock clk/4 which may be misaligned with clock clk with respect to time. The outputs 201 may now easily be counted by a lower speed counter or added by a lower speed adder so as to easily be displayed or utilized in other lower speed processing functions.

Figure 3A:
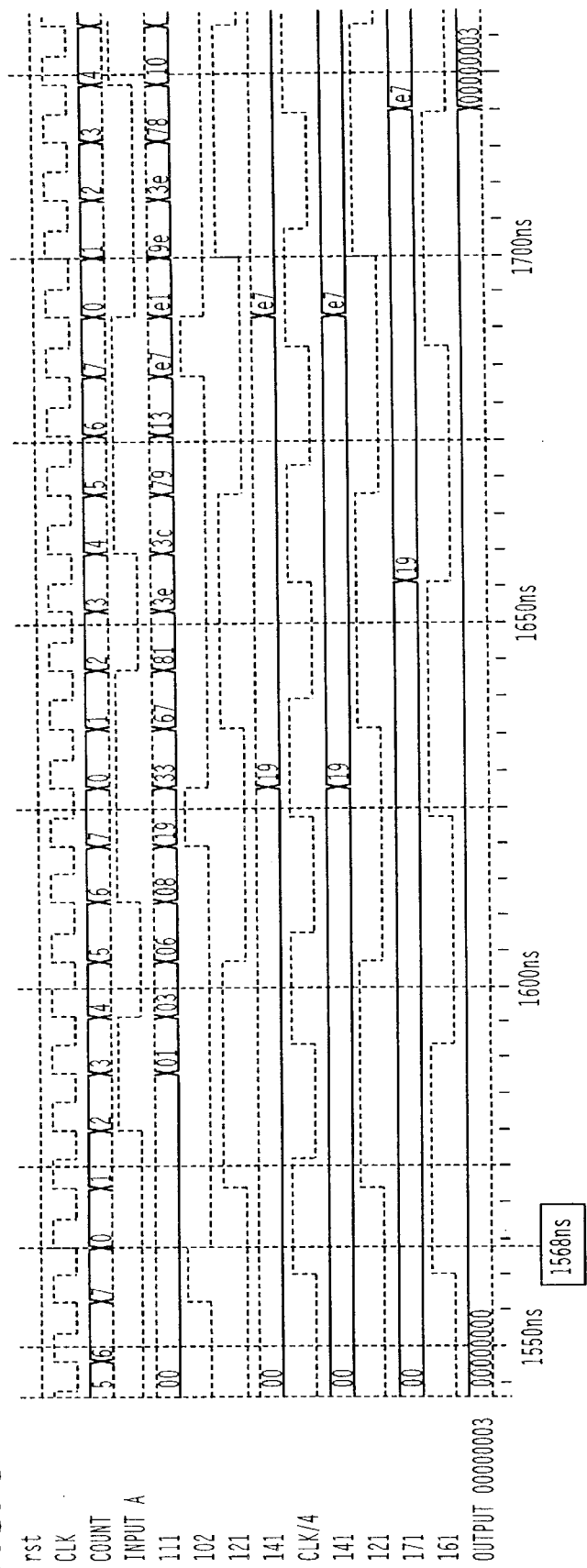
FIGS. 3A–3D are a waveform diagrams showing the waveform at various points in FIG. 1.
Figure 3B:
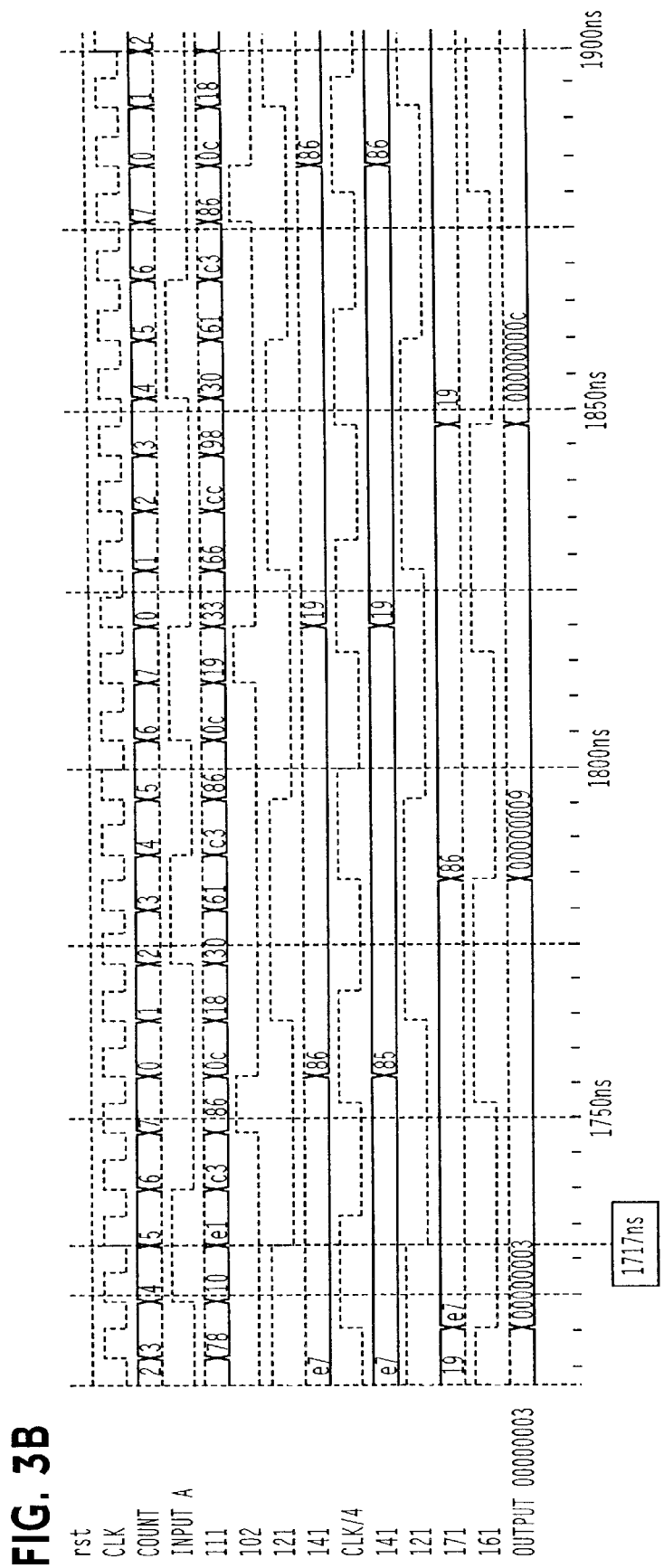
Figure 3C:
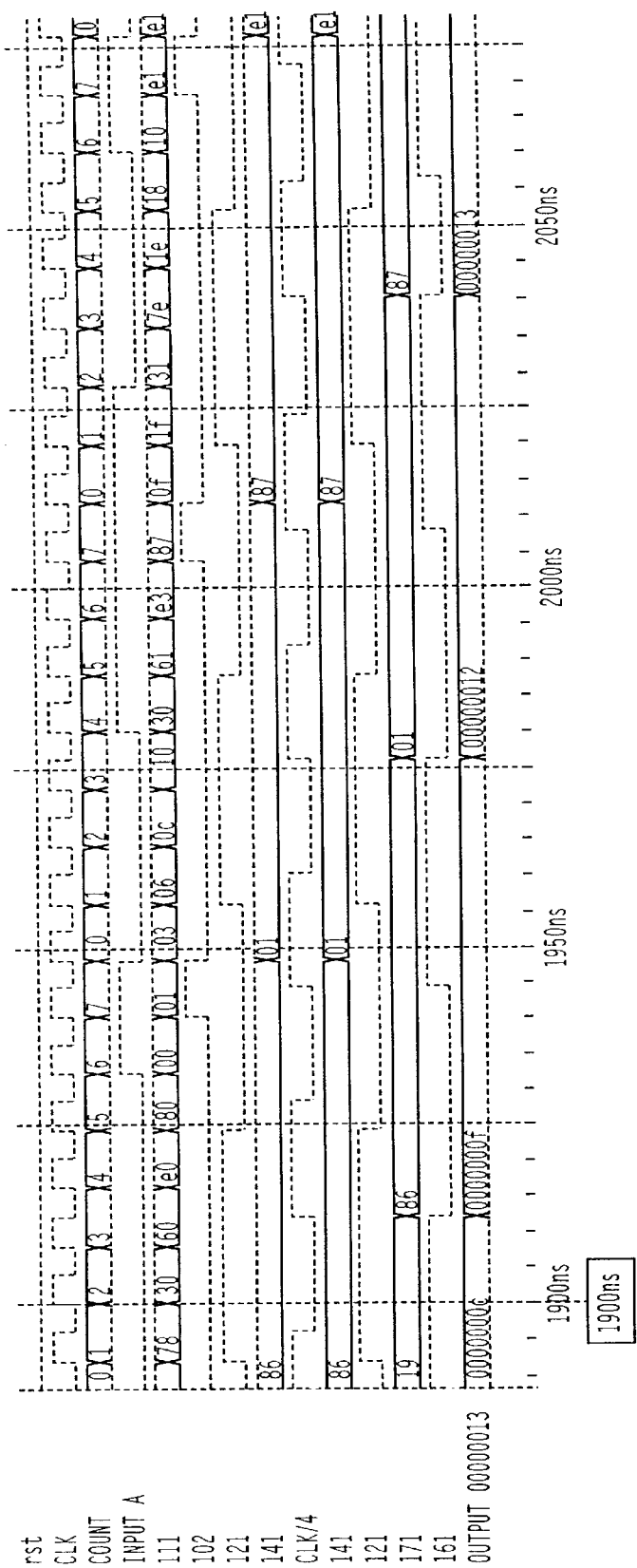
Figure 3D:
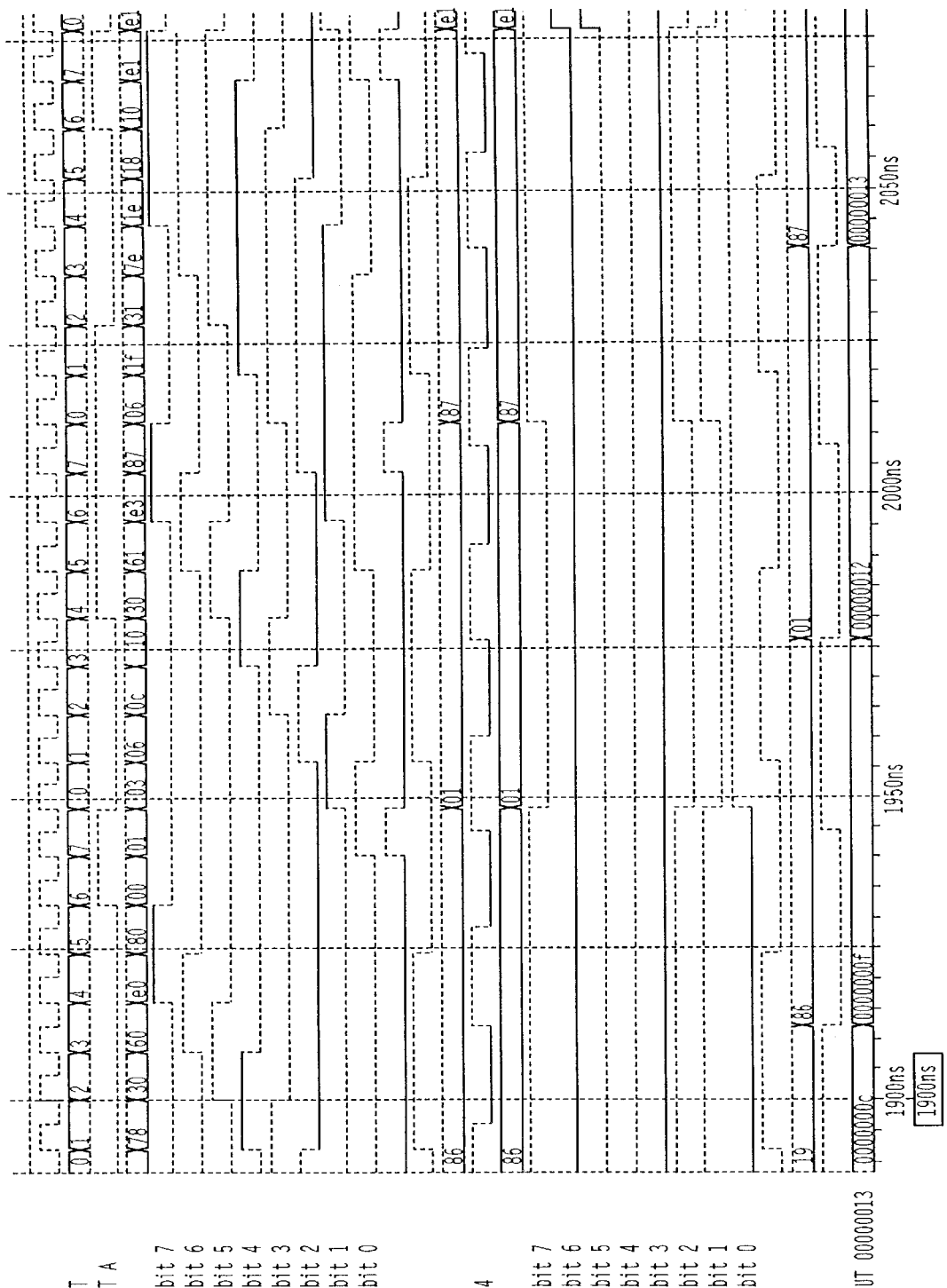

FIGS. 3A–3D are example waveform diagrams showing the waveform at various points in FIG. 1. That is, FIG. 3A illustrates the start of the event count, FIG. 3B illustrates the next cycle, FIG. 3C illustrates the last cycle, and lastly, FIG. 3D illustrates the third or last cycle. In FIG. 3D, the 111 and 141 output buses are shown at the bit level.

The top trace is the reset signal rst which was a high logic level prior at an earlier time period. The second trace is the clock CLK. For exemplary purposes, this clock is at a frequency 125 MHz.

The following trace is the count of the clock CLK as stored in the counter 100. For example, in FIG. 3B, the cursor at the count 5 of the clock CLK.

The following trace is the input A. This is the input signal which is to be shifted from a high speed domain to a lower speed domain.

The following trace is the output 111 of the shift register 110 which is shifted using the same clock signal CLK as that used for the counter 100 and the D type flip flop 120.

The following trace is the output 102 of the counter 100. This occurs when the counter 100 has counted to 7 in this example.

The following trace is the output 121 of the D type flip flop 120. The D type flip flop 120 has the output 101 of the counter 100 fed to the inverted D input. The flip flop 120 receives the same clock signal CLK used to clock the counter 100. This output signal 121 is a data ready signal which is used to enable the leading edge detector 160.

The following trace is the low speed clock CLK/4. In the example, it is set to a frequency of 125/4 MHz (that is, 31.25 MHz). This clock can easily be derived from the clock CLK using a 2 bit counter in the present example.

The following trace is the output 141 of the latch circuit consisting of the sets of multiplexers 130 and D type flip flops 140. Note that the flip flops 140 are clocked by the same clock used to clock the shift register 111. Accordingly, if the output 102 is at a high logic level and the output 111 shifts from a high logic level to a low logic level at the leading edge of the clock CLK, the flip flops 140 will change state at the leading edge of the clock CLK.

The next trace is the output 121 repeated for convenience sake.

The following trace is of the output 171 of the latch circuit consisting of the multiplexers 190 and D type flip flops 170. The output 171 of the flip flops 170 are set to a level equal to that of the output 141 upon the leading edge of the clock clk/4 providing that the output of the leading edge detector 161 is at a high logic level.

The following trace is the output 161 of the leading edge detector. The output 161 becomes a high logic level upon the leading edge of the clock clk/4 if the enable input 121 is at a high logic level.

The last trace 201 is the output of the flip flops 200. The output 201 corresponds to the input A but at a clock frequency one quarter that of the clock frequency of input A.

While there has been illustrated and described what is considered to be one embodiment of the present invention, it will be understood by those skilled in the art that various changes and modifications may be made and equivalents may be substituted for elements thereof without departing from the true scope of the present invention. For example, other latching circuits may be substituted for the combination of the multiplexer and D type flip flop. Furthermore, while the present invention has been implemented by hardware in the example, it is to be understood that software implementations are easily possible.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An apparatus comprising:
   a counting unit for receiving and counting a high-speed clock;
   a shift register, connected to a first set of latches, for receiving an input signal and shifting it out to be latched by said first set of latches in accordance with said high-speed clock, a latch input of said first set of latches receiving a first output of said counting unit;
   a second set of latches connected to a bitwise adder connected to a third set of latches, outputs of said second and third sets of latches being input to said bitwise adder; and
   a detector having an output connected to latch inputs of said second and third sets of latches, for receiving a second output of said counting unit, said second and third sets of latches and said detector operating in accordance with a lower-speed clock, said lower speed clock being a sub-multiple of said higher speed clock;
   wherein an output of said third set of latches corresponds to the input signal shifted from a higher-speed domain to a lower-speed domain.

2. The apparatus of claim 1, said counting unit comprising a counter coupled to a flip flop.

3. The apparatus of claim 1, said first through third sets of latches each comprising two input multiplexers connected to respective flip flops.

4. The apparatus of claim 2, said first through third sets of latches comprising two input multiplexers connected to respective flip flops.

5. The apparatus of claim 1, said detector comprising a leading edge detector.

6. The apparatus of claim 2, said detector comprising a leading edge detector.

7. The apparatus of claim 3, said detector comprising a leading edge detector.

8. An apparatus comprising:
   a counter having a clock input for receiving a first clock;
   a shift register having a clock input for receiving said first clock and having a data input for receiving an input signal;
   a flip flop having an input connected to a first output of said counter and having a clock input for receiving said first clock;
   a first latching circuit having a clock for receiving said first clock and having a data input connected to an output of said shift register and having a latch input connected to a second output of said counter;
   a leading edge detector having a data input connected to an output of said flip flop and having a clock input for receiving a second clock, said second clock being of a frequency which is a sub-multiple of a frequency of said first clock;
   a second latching circuit having a data input connected to an output of said first latching circuit and having a clock input for receiving said second clock and having a latch input connected to an output of the leading edge detector;
   a third latching circuit having a data input and having a clock input for receiving said second clock and having an output for outputting a signal which corresponds to the input signal shifted from a high-speed domain to a lower-speed domain; and
   a bitwise adder for adding an output from said second latching circuit to an output of said third latching circuit and for outputting a result to said data input of said third latching circuit.

9. The apparatus of claim 8, said counter, shift register, flip flop, first through third latching circuits, and said leading edge detector each having a reset input for receiving a reset signal.

10. The apparatus of claim 8, each of said first through third latching circuits comprising multiplexers having first and second inputs and a control input and respective flip flops, wherein an output of said multiplexer is inputted to a data input of said flip flop, and an output of said flip flop serves as said latch output and is also inputted to said first input of said multiplexer, and wherein said second input of said multiplexer serves as said data input of said latching circuit and a clock input of said flip flop serves as said clock input of said latching circuit, and said control input of said multiplexer serves as said latch input of said latching circuit.

11. The apparatus of claim 9, each of said first through third latching circuits comprising multiplexers having first and second inputs and a control input and respective flip flops, wherein an output of said multiplexer is inputted to a data input of said flip flop, and an output of said flip flop serves as said latch output and is also inputted to said first input of said multiplexer, and wherein said second input of said multiplexer serves as said data input of said latching circuit and a clock input of said flip flop serves as said clock input of said latching circuit, and said control input of said multiplexer serves as said latch input of said latching circuit.

12. The apparatus of claim 8, said second clock frequency being equal to said first clock frequency divided by N, wherein N is a positive integer greater than 1.

13. The apparatus of claim 12, said counter having a range of from 0 to $2^{N-1}-1$, wherein N is a positive integer greater than 1.

14. The apparatus of claim 13, said first output of said counter corresponding to a count of N/2.

15. The apparatus of claim 12, said shifter register having a width of $2^{N-1}$, wherein N is a positive integer greater than 1.

16. The apparatus of claim 9, said second clock frequency being equal to said first clock frequency divided by N, wherein N is a positive integer greater than 1.

17. The apparatus of claim 16, said counter having a range of from 0 to $2^{N-1}-1$, wherein N is a positive integer greater than 1.

18. The apparatus of claim 17, said first output of said counter corresponding to a count of N/2.

19. The apparatus of claim 16, said shifter register having a width of $2^{N-1}$, wherein N is a positive integer greater than 1.

20. A method comprising:

receiving an input signal in a high-speed domain;

receiving a high-speed clock;

receiving a lower-speed clock, the lower-speed clock having a frequency which is a sub-multiple of the frequency of the frequency of the higher-speed clock;

counting the higher-speed clock;

shifting the input signal in a shift register in accordance with the higher-speed clock;

latching a first latch at a first predetermined count of said higher-speed clock and latching an output of the shift register at a second predetermined count of the higher-speed clock, the latching occurring in accordance with the higher-speed clock;

detecting the leading edge of the latched first predetermined count in accordance with the lower speed clock;

latching the latched output of the shift register upon the leading edge detection in accordance with the lower-speed clock, and feeding the latched output to a bitwise adder whose output is in turn latched upon the leading edge detection in accordance with the lower-speed clock, the latched output of the adder being fed back to an input of the adder and also corresponding to the higher-speed input shifted to a lower-speed domain.

21. An apparatus comprising:

a counting unit for receiving and counting a high-speed clock;

a shift register, connected to a first set of latches, for receiving an input signal and shifting it out to be latched by said first set of latches in accordance with said high-speed clock, a latch input of said first set of latches receiving a first output of said counting unit;

a second set of latches connected to a digital component connected to a third set of latches, outputs of said second set of latches being input to said digital component; and a detector having an output connected to latch inputs of said second and third sets of latches, for receiving a second output of said counting unit, said second and third sets of latches and said detector operating in accordance with a lower-speed clock, said lower speed clock being a sub-multiple of said higher speed clock; wherein an output of said third set of latches corresponds to the input signal shifted from a higher-speed domain to a lower-speed domain.

* * * * *